(12) United States Patent
Gennesseaux

(10) Patent No.: US 11,745,386 B2
(45) Date of Patent: Sep. 5, 2023

(54) METHOD FOR BINDING A CYLINDRICAL PART BY THE TENSIONED WINDING OF FIBERS

(71) Applicant: ENERGIESTRO, Châteaudun (FR)

(72) Inventor: André Gennesseaux, Conie-Molitard (FR)

(73) Assignee: ENERGIESTRO, Châteaudun (FR)

( * ) Notice: Subject to any disclaimer, the term of this patent is extended or adjusted under 35 U.S.C. 154(b) by 280 days.

(21) Appl. No.: 17/274,540

(22) PCT Filed: Sep. 18, 2019

(86) PCT No.: PCT/FR2019/052178
§ 371 (c)(1),
(2) Date: Mar. 9, 2021

(87) PCT Pub. No.: WO2020/058630
PCT Pub. Date: Mar. 26, 2020

(65) Prior Publication Data
US 2021/0308903 A1    Oct. 7, 2021

(30) Foreign Application Priority Data

Sep. 18, 2018    (FR) ...................................... 1858422

(51) Int. Cl.
*B28B 23/14*    (2006.01)
*F03G 3/08*    (2006.01)

(52) U.S. Cl.
CPC ................ *B28B 23/14* (2013.01); *F03G 3/08* (2013.01)

(58) Field of Classification Search
CPC ................................. B28B 23/14; F03G 3/08
See application file for complete search history.

(56) References Cited

U.S. PATENT DOCUMENTS

2017/0101286 A1    4/2017    Brockman et al.

FOREIGN PATENT DOCUMENTS

| EP | 3212960 B1 | * | 10/2018 | ............. B29C 70/32 |
|---|---|---|---|---|
| EP | 3212960 B1 | | 10/2018 | |
| FR | 2871454 A1 | * | 12/2005 | ............. B65H 59/16 |
| FR | 2871454 A1 | | 12/2005 | |
| FR | 3027644 A1 | | 4/2016 | |
| FR | 3059988 A1 | | 6/2018 | |
| WO | 2017203109 A1 | | 11/2017 | |
| WO | WO-2018109347 A1 | * | 6/2018 | ............. B29C 70/00 |

OTHER PUBLICATIONS

International Search Report dated Feb. 19, 2020 in corresponding International Application No. PCT/FR2019/052178; 6 pages.

* cited by examiner

*Primary Examiner* — Vicky A Johnson
(74) *Attorney, Agent, or Firm* — Maier & Maier, PLLC

(57) ABSTRACT

A method for binding a cylindrical part by the tensioned winding of fibers, the method including a preliminary step of passing the fibers around at least two braked tensioning cylinders in order to increase the tension in the fibers, wherein the method includes increasing the diameter of the cylinders as the tension in the fibers increases.

12 Claims, 1 Drawing Sheet

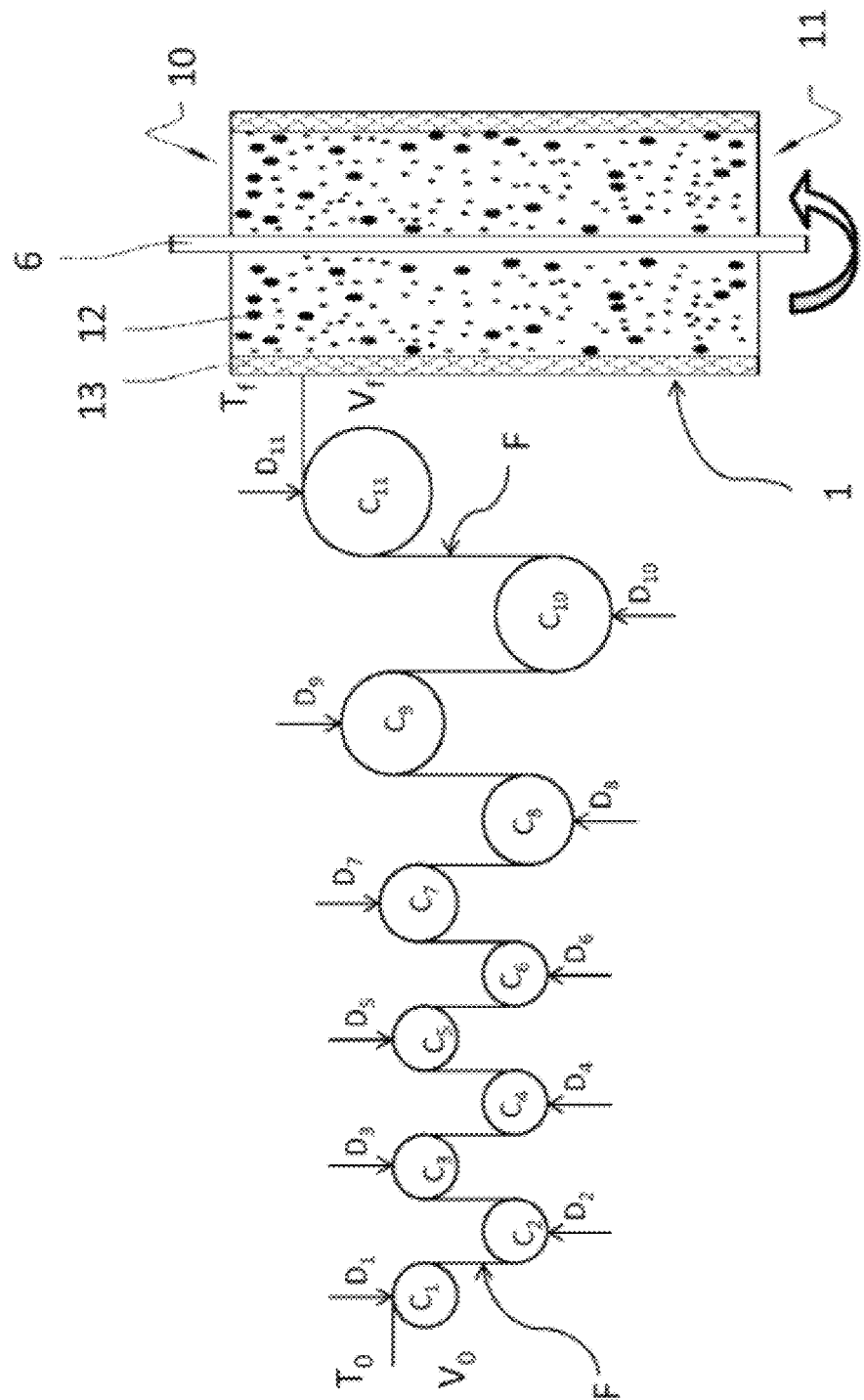

METHOD FOR BINDING A CYLINDRICAL PART BY THE TENSIONED WINDING OF FIBERS

FIELD

The present invention relates to a method for binding a cylindrical part by the tensioned winding of fibers, and more specifically to a method for manufacturing a flywheel comprising at least one cylinder made of concrete.

BACKGROUND

It is common to use a flywheel in devices for the temporary storage of energy, which find applications in many fields such as storing and smoothing intermittent renewable energies of the wind or solar type, supplying isolated sites with electricity, recovering energy for the braking of vehicles, etc.

Unlike other electrical energy storage devices, such as electric accumulators, the flywheel offers the main advantage of an almost unlimited lifespan, implying a lower storage and maintenance cost over time than with other devices.

Typically, a flywheel comprises a body of solid mass, also usually referred to by the term "mass", connected to a rotary shaft of an electric motor. The electric motor rotates the flywheel, which can reach very high speeds of rotation in a few minutes or even in a few seconds. After the supply of power to the electric motor is stopped, the mass of the flywheel having stored the kinetic energy continues to rotate and can then return mechanical energy which is in turn reconverted into electrical energy, for example using the motor as an electric generator.

The centrifugal force undergone by the flywheel causes very high tensile stresses for the material that constitutes its mass. It is therefore advisable to choose a construction material that is highly resistant to tension, such as steel or carbon. But these materials are very expensive.

The Applicant's patent EP3 212 960B1 describes a method for producing an energy storage flywheel made of concrete prestressed by glass fiber wound under tension. The advantage of concrete is its very low cost compared to steel and carbon.

This flywheel comprises a mass body, or mass, comprising a main component material that is concrete, this body being wrapped over at least part of its outer surface with reinforcing fibers whose winding tension around the body causes compression of said main material. The body is cylindrical and the reinforcing fibers then form a tensioned casing covering at least the outer cylindrical surface of the body, possibly as well as the two end bases of the cylindrical body.

Concrete is not a material intended to be used for an energy storage flywheel because it has practically zero tensile strength. By associating with the concrete the reinforcing fibers wound under tension, despite the inherent defect of concrete relating to its relatively low tensile strength, the flywheel unexpectedly exhibits a property of high tensile strength, even at very high speeds of rotation.

Surprisingly, the reinforcing fibers associated with the outer surface of the concrete mass result in sufficiently prestressing the concrete, in a manner that generates the appropriate tensions to oppose the tensile forces the flywheel will undergo during its rotation. The assembly of concrete/outer covering of the concrete by tensioned reinforcing fibers advantageously results in a structure capable of withstanding the tensile forces that an energy storage flywheel will undergo. Such a flywheel structure makes it possible to achieve very high speeds of rotation, well before the risk of rupture of the main component material, thus allowing a large amount of energy to be stored.

Tensioned winding, or binding, is a well-known technology which is used to prestress concrete parts (pipes, tanks, etc.). The basic principle is to wind a wire/fibers around a cylindrical part while exerting tension on the thread in order to keep it taut. The tension in the wound wire/fibers results in radial compression in the cylindrical part. It is necessary to stretch the wire/fibers as much as possible in order to save material (when the tension is halved, it is necessary to wind twice as much wire/fibers to achieve the same compression). But applying high tension to a wire/fibers in motion is not easy.

The theory shows that the tension transmissible to a wire/fibers by adhesion on a braked cylinder is an (exponential) function of the winding angle: $T(\alpha)=T(0)\cdot\exp(\mu\cdot\alpha)$, where $\alpha$ is the winding angle and $\mu$ the coefficient of friction between the wire/fibers and the cylinder. To transition from a low initial tension to a high final tension, the angle can be much greater than a complete turn, which implies that it is necessary to use several cylinders. For example, if the tension must be multiplied by 1000 and the coefficient of friction is 0.1, more than 10 full turns are needed, so more than 20 cylinders if the wire is wound half a turn on each cylinder.

Several independent cylinders can of course be used, each with its own braking system, but if many are required then the price and size become prohibitive, which is why solutions with a single braking system have been proposed.

Patent FR2871454 thus describes a braking system consisting of two cylinders, of which at least one is braked. The wire can be wound back and forth many times between the cylinders, which allows a winding angle on the braked cylinder that is as large as desired.

The systems described above, in which the surface velocity of the cylinders is constant, work well with strong wires like steel wire, but not with fragile wires like glass fiber which is made of thousands of very fine filaments. The reason is that the wire is subjected to very difficult conditions at the end of the tensioning operation: its tension, its contact pressure with the cylinder, and its sliding velocity on the cylinder are very high. These conditions can cause a few filaments to rupture, which can then become caught in the machine and cause the fiber to break.

However, the sliding is due to the elasticity of the fiber: it elongates when pulled on, so it is longer at the end than at the beginning, and its velocity is therefore greater at the end than at the beginning, while the surface velocity of the cylinders is constant.

SUMMARY

The object of the invention is to respond at least in part to the limitations of the prior art mentioned above.

To this end, the invention relates to a method for binding a cylindrical part by winding tensioned fibers, the method comprising a preliminary step of passing said fibers around at least two braked tensioning cylinders in order to increase the tension in said fibers, characterized in that it consists of increasing the diameter of the cylinders as the tension in the fibers increases.

According to preferred embodiments of the present invention:

n being an integer greater than or equal to 2 and m an integer strictly less than n, said method consists of maintaining a constant diameter for the first m cylinders ($C_1$; $C_m$) then increasing said diameter of the last (n–m) cylinders ($C_{m+1}$; $C_n$), the diameter of the last (n–m) cylinders increases arithmetically, the method consists of increasing the peripheral velocity of the cylinders as the tension in the fibers increases, n being an integer greater than or equal to 2 and p an integer strictly less than n, said method consists of maintaining a constant peripheral velocity for the first p cylinders ($C_1$; $C_p$) then increasing said peripheral velocity of the last (n–p) cylinders ($C_{p+1}$; $C_n$), the peripheral velocity of the last (n–p) cylinders increases arithmetically, the diameter $D_n$ of the last cylinder $C_n$ is at least equal to 10% of the diameter of the cylindrical part to be bound, all the cylinders are synchronized by gears, or by a chain, or by a toothed belt, the brake of the cylinders comprises an electric motor synchronized with said cylinders, operating as a generator and supplying power to an electric motor of the cylindrical part to be bound, the total number n of cylinders ($C_1$; $C_n$) is between 2 and 50, preferably between 10 and 30, the method causes the stress in the reinforcing fibers to increase from about 1 MPa to about 1000 MPa.

The invention further relates to a method for manufacturing a flywheel as described above, characterized in that it comprises a step of manufacturing a concrete body by molding, then, after the hardening of the concrete, a step of tensioned filament winding of fibers using said method.

The object of the invention also relates to a flywheel obtained using the method as described above, characterized in that it comprises a cylindrical mass body of which the main component material has a compressive strength of at least 25 MPa, such as concrete, said body being enveloped, over at least part of its external surface, with fibers obtained with the method as described above and for which the winding tension around the body generates compression of said main material.

BRIEF DESCRIPTION OF THE FIGURE

FIG. 1 represents a method for reinforcing a solid flywheel using tensioned fibers.

DETAILED DESCRIPTION

Other particular advantages, aims and features of the invention will become apparent from the following non-limiting description of at least one particular embodiment of said object of the invention, with reference to FIG. 1 which represents a method for reinforcing a solid flywheel using tensioned fibers.

Thus, FIG. 1 illustrates a flywheel 1 of cylindrical shape extending longitudinally between two distal ends 10 and 11 along an axis of revolution. This flywheel 1 comprises a mass 12 made of a component material such as concrete, and a casing 13 made of reinforcing fibers F wound under tension and inducing compressive forces on the mass 12. The concrete mass 12 is for example made by molding. The flywheel 1 incorporates a shaft 6 which protrudes from the end bases 10 and 11. This shaft 6 is made integral with the body of the flywheel 1 during manufacture by molding the mass 12, the shaft 6 having previously been placed in the mold into which the concrete was poured.

The casing/housing 13 is obtained by tensioned winding of the reinforcing fibers F, for example glass fibers, around the concrete mass 12 in order to generate compressive stress on said mass 12 when the latter is at rest, in other words with no rotation of the flywheel 1. The material of the mass 12 is thus prestressed.

For example, the main material is concrete having a compressive elastic limit of 100 MPa. The diameter of the cylinder forming the concrete core 12 is substantially equal to 0.6 m. It has a length (height) of 2 m. Its mass is approximately 1.4 t.

The thickness of the casing 13 of glass fibers is for example 12 mm. The mass of glass fibers is 0.11 t, which is much lower than the mass of the concrete core 12.

The method for obtaining the tensioned fibers F and then winding them around the cylinder 12 is described below.

Represented in this FIG. 1 are a series of braked tensioning cylinders numbered $C_1$ to $C_{11}$, and more generally $C_1$ to $C_n$ with n>2.

The fibers F are stretched by having them pass successively over a portion of the outer surface of each of these cylinders which are rotated in a synchronized manner. More precisely, the odd-indexed cylinders rotate clockwise while the even-indexed cylinders rotate counterclockwise, so that the fibers F are successively tensioned between each pair of consecutive cylinders (between $C_1$ and $C_2$, then $C_2$ and $C_3$, etc. until $C_n$).

As was presented above in the introductory part, the invention consists of increasing the diameter of the cylinders $C_1$ to $C_n$ as the tension T increases in the fibers F, in order to follow their elongation and limit their sliding velocity on said cylinders.

Thus, as can be seen in FIG. 1 (the proportions, in particular those of the cylinders, are exaggerated in order to better understand the invention), the first m cylinders, m being an integer strictly less than n, m being equal for example to 5 in the present case, all have the same diameter $D_m$ such that $D_1=D_2=D_3=D_4=D_5$.

On the other hand, the last (n–m) cylinders $C_{m+1}$ to $C_n$, meaning cylinders $C_6$, $C_7$, $C_8$, $C_9$, $C_{10}$ and $C_{11}$, have a diameter $D_n$ which gradually increases.

In practice, the variations in the diameter of the cylinders are extremely small: for a glass fiber increasing from a tensile stress at infeed of 1 MPa to a stress at outfeed of 1000 MPa and a determined elongation for example (non-limiting) of 1.4%, the difference in diameter between two cylinders starting from the cylinder of rank (m+1) averages 0.15%. For a cylinder $C_6$ that is 50 mm in diameter, this makes a difference of 0.08 mm for each cylinder of higher tank, imperceptible to the naked eye but easily achievable mechanically by adjustment.

The corollary of this increase in the diameter D of the (last) cylinders is an increase in their peripheral velocity as the tension T in the fibers F increases.

Thus, if $V_n$ is the peripheral velocity of cylinder n, we therefore implement: $V_1<V_2<V_3<V_4<\ldots<V_n$.

It is possible to use cylinders of very different diameters, rotating at different speeds, provided the condition $V_1<V_2<V_3<V_4<\ldots<V_n$ is respected. This can be of interest in reducing the contact pressure, which is proportional to the tension and inversely proportional to the diameter of the cylinder. It is therefore necessary to increase the diameter of the last cylinders, where the tension of the fiber is the highest.

Preferably, the diameter $D_n$ of the last cylinder $C_n$ is at least equal to 10% of the diameter of the cylindrical part to be bound.

Thus, the above relation is valid only starting from the cylinder of rank p+1, p being an integer strictly less than n, and this is true up to and including the last cylinder of rank n.

Consequently, if $V_n$ is the peripheral velocity of cylinder n, we therefore implement: $V_{p+1} < V_{p+2} < V_{p+3} < V_{p+4} < \ldots < V_n$. In this case, it means that $V_6 < V_7 < V_8 < V_9 < V_{10} < V_{11}$.

Preferably it will be arranged so that m=p.

From a mathematical point of view, if the first cylinder $C_1$ has a diameter $D_1$, and the tension in the fibers F increases from $T_0$ to $T_1$, the second cylinder will have a diameter $D_2$ equal to:

$$D_2 = D_1 \times (1 + T_1/(S \times E))/(1 + T_0/(S \times E)),$$

where S is the cross-sectional area of the fiber, and E its Young's modulus.

$T_0/(S \times E)$ is the elongation of the fiber at the infeed to the first cylinder $C_1$.

$T_1/(S \times E)$ is the elongation of the fiber at the outfeed from the first cylinder $C_1$.

In this manner, the fiber arrives on each cylinder with zero sliding: they are "synchronized".

In practice, there is very little sliding on the first cylinders, but it increases exponentially as the tension T in the fibers F increases. When the sliding reaches a certain value (for example here the value of 0.1% is chosen arbitrarily and as a non-limiting example), it is possible to reduce the increase in the diameter of the cylinders. Advantageously, the peripheral velocity of the last (n–p) cylinders increases arithmetically, rather than exponentially.

With the invention, it is possible to choose the contribution of each cylinder to the total increase in tension in the fibers F. In practice, this means that it is not necessary to have sliding over the entire area of each cylinder C around which the fibers F pass.

The sliding angle is different from the winding angle. The winding angle is given by the geometry of the machine, and it remains constant. The sliding angle depends on the torque applied to the cylinder: it varies between 0 (zero torque) and the winding angle (maximum transmissible torque). We can therefore have winding over 180°, but sliding over only 40°.

It is thus possible to use the entire winding area at the start, when the tension is low, and only partially use it at the end, when the tension is high. It is thus possible to limit the maximum sliding velocity and protect the fiber. In return, it will be necessary to install more cylinders, their number able to vary from a few to about fifty and advantageously between about 10 and 30.

In order to further reduce the maximum sliding, it is possible to have an arithmetic progression of the diameter D of the last cylinders, and therefore also of their respective peripheral velocities.

To reduce the contact pressure between fibers and cylinders, which can reach 4 MPa (40 bar) and could damage the fibers which are sliding on the cylinder, the diameter D of the cylinders should be greatly increased so that the last one(s) is (are) fairly large compared to the flywheel 1. Here it is again possible to have an arithmetic progression of the diameter D of the last cylinders. Advantageously, the diameter $D_n$ of the last cylinder $C_n$ is at least equal to 10% of the diameter of the cylindrical part to be bound.

Gears make it possible to obtain the synchronization of the various speeds of rotation, then adjustment of the diameters makes it possible to obtain the desired sliding on each cylinder.

It is interesting to note that this increase in diameter in order to reduce the contact pressure is independent of the increase in the peripheral velocity in order to reduce sliding.

In practice, the following procedure is used:
- the approximate diameter of the cylinders is first calculated to limit the contact pressure;
- the gears are chosen so as to allow obtaining a substantially constant peripheral velocity (a pulley four times larger will turn four times slower);
- the exact diameter of the cylinders making it possible to obtain the anticipated peripheral velocity for limiting sliding is then recalculated.

It is also provided to equip the brake of the cylinders with an electric motor synchronized with said cylinders, operating as a generator and supplying power to an electric motor of the cylindrical part to be bound.

Once obtained, the glass fibers F are wound at an angle close to 90° relative to the longitudinal axis 6 of the concrete cylinder 12 of the flywheel 1, and under a tension which generates stress of about 1000 MPa. The initial prestressing (compression) in the concrete is 50 MPa. The flywheel 1 according to the invention can rotate up to 7700 revolutions/min, the speed at which the prestressing in the concrete becomes zero. The stored energy is then 23 MJ or 6.4 kWh.

As a result, due to the main material of the mass of the flywheel, which is prestressed via the tensioned winding of reinforcing fibers, the invention makes it possible to provide a compression of said material such that it is possible to achieve high speeds of rotation before reaching the point of rupture of the material, which very advantageously allows a large amount of energy to be stored.

It is of course understood that the detailed description of the object of the invention, provided solely for illustrative purposes, does not in any way constitute a limitation, the technical equivalents also being included within the scope of the invention.

The invention can be implemented with a two-cylinder system: it is sufficient to manufacture the braked cylinder (or cylinders) with stepped diameters $D_n$ satisfying the following rule: $D_1 < D_2 < D_3 < D_4 < \ldots < D_n$.

The gears can also be replaced with a chain or a toothed belt.

The invention claimed is:

1. A method for binding a cylindrical part by the tensioned winding of fibers, comprising a preliminary step of said fibers passing around at least two braked tensioning cylinders ($C_1$; $C_2$) in order to increase the tension therein and consisting of increasing the diameter D of the cylinders as the tension in the fibers increases, wherein, n being an integer greater than or equal to 2 and m an integer strictly less than n, said method consists of maintaining a constant diameter for the first m cylinders ($C_1$; $C_m$) then increasing said diameter of the last (n–m) cylinders ($C_{m+1}$; $C_n$).

2. The method according to claim 1, wherein the diameter of the last (n–m) cylinders increases arithmetically.

3. The method according to claim 1, wherein the cylinders have a peripheral velocity that increases as the tension in the fibers increases.

4. The method according to claim 3, wherein, a peripheral velocity for the first p cylinders ($C_1$; $C_p$) is maintained constant, and then the peripheral velocity of the last (n–p)

cylinders ($C_{p+1}$; $C_n$) is made increasing, wherein n is the integer greater than or equal to 2 and p is an integer strictly less than n.

5. The method according to claim 4, wherein the peripheral velocity of the last (n−p) cylinders increases arithmetically.

6. The method according to claim 1, wherein the diameter $D_n$ of the last cylinder $C_n$ is at least equal to 10% of the diameter of the cylindrical part to be bound.

7. The method according to claim 1, wherein all the cylinders are synchronized by gears, or by a chain, or by a toothed belt.

8. The method according to claim 7, wherein the cylinders have a brake provided with an electric motor synchronized with said cylinders, operating as a generator and supplying power to an electric motor of the cylindrical part to be bound.

9. The method according to claim 1, wherein the total number n of cylinders ($C_1$; $C_n$) is between 2 and 50.

10. The method according to claim 9, wherein the total number n of cylinders ($C_1$; $C_n$) is between 10 and 30.

11. The method according to claim 1, wherein the method causes the stress in the reinforcing fibers to increase from about 1 MPa to about 1000 MPa.

12. A method for manufacturing a flywheel, wherein the method comprises a step of manufacturing a concrete body by molding, then, after the hardening of the concrete, a step of binding the concrete body by winding tensioned fibers using the method according to claim 1.

\* \* \* \* \*